United States Patent [19]

Kacir et al.

[11] 3,948,833

[45] Apr. 6, 1976

[54] COMPOSITIONS FOR RIGID ASBESTOS - REINFORCED POLYVINYL CHLORIDE

[75] Inventors: Lior Kacir; Moshe Narkis, both of Haifa, Israel

[73] Assignees: Centre for Industrial Research (CIR) Ltd., Haifa; Palram Plastic Works, Kevutzat Poalim Ltd., Ramat Yohanan, both of Israel

[22] Filed: Apr. 13, 1973

[21] Appl. No.: 350,701

[30] Foreign Application Priority Data
Apr. 17, 1972 Israel.................................... 39240

[52] U.S. Cl. ...... 260/23 XA; 260/23 EP; 260/42.26; 260/42.37; 260/45.7 R; 264/41; 264/221
[51] Int. Cl.².......................................... C08L 91/00
[58] Field of Search.......... 260/23 XA, 23 EP, 41 R, 260/45.75 R, 23 X, 42.26, 42.37

[56] References Cited
UNITED STATES PATENTS

| | | | |
|---|---|---|---|
| 2,275,957 | 3/1942 | Groff et al. | 260/23 XA |
| 2,711,401 | 6/1955 | Lally | 260/23 XA |
| 2,734,881 | 2/1956 | Lally et al. | 260/23 XA |
| 2,921,917 | 1/1960 | Long | 260/45.75 R |
| 3,084,135 | 4/1963 | Sculli | 260/23 X |
| 3,180,848 | 4/1965 | Thompson | 260/23 XA |

OTHER PUBLICATIONS

Chevassus et al. "The Stabilization of Polyvinyl Chloride" pp. 130, 302 & 303 Pub. by St. Martins Press, N. Y. 1963.

*Primary Examiner*—Lewis T. Jacobs
*Assistant Examiner*—william E. Parker
*Attorney, Agent, or Firm*—Levonna Herzog

[57] ABSTRACT

An asbestos-vinyl chloride polymer composition suitable for melt processing into rigid products is disclosed. The composition comprises (a) a vinyl chloride homopolymer, vinyl chloride copolymer or a mixture thereof, (b) up to 150% by weight based on the weight of polymer of asbestos, and (c) a stabilizer system composed of 1–5% by weight based on the weight of polymer of at least one organometal compound wherein the metal is selected from Ba, Cd, Zn, Pb, Sn, Ca or combinations thereof, at least 3% by weight based on the weight of polymer of epoxide and a compound selected from a polyol or a metal derivative of the polyol or an amino compound of polyacetic acid in an amount of 3–20% by weight based on the weight of the polymer.

16 Claims, No Drawings

COMPOSITIONS FOR RIGID ASBESTOS - REINFORCED POLYVINYL CHLORIDE

The present invention relates to compositions based on asbestos reinforced polyvinyl chloride (P.V.C.) to be used in melt processing for the manufacture fo rigid products. In the present application the term of melt processing includes extrusion and injection molding.

As is well known in the art and defined, for example, in KUNSTSTOFF-LEXIKON, edited by Dr. K. Stoeckhert, rigid P.V.C. includes all P.V.C. mixtures containing 0 to about 12% plasticizer.

The improvements in the engineering performance of P.V.C. by incorporating of reinforcing fibers in the P.V.C. matrix are now fully recognized. These improvements include among others:
 a. reduction in rate of creep,
 b. increase in strength properties,
 c. enhancement of engineering properties,
 d. reduction in coefficient of thermal expansion.

Among these fibers, fiberglass and asbestos are most utilized and especially asbestos in view of its relative low cost. Asbestos reinforced P.V.C. is now actually produced and meets the need in general industry for thermoplastic sheets, possessing better properties then are obtainable from unreinforced rigid polyvinyl chloride sheets material. Among these better properties, the following can be mentioned:
 a. increase in the modulus of elasticity,
 b. decrease in the thermal expansion coefficient,
 c. stability in the dimensions,
 d. increase in tensile, flexural and compression strength,
 e. self extinguishing property,
 f. decrease of notch sensitivity,
 g. increase of impact strength.

These sheets are widely used as surface covering for walls. The method by which these asbestos reinforced rigid P.V.C. sheets are produced, which is also the only method known up to now, is by calendering. This method consists in the addition of asbestos fibers into a dispersion of 30% P.V.C. and 70% of an organic solvent (toluene or/and methyl-ethyl katone), thoroughly mixing the mass and transferring it on calenders. The thin sheets obtained by calendering are introduced into an oven to remove the solvents and are after that compressed to the desired thickness. The disadvantages of the method are:
 1. The necessity of working with solvents which is a tedious operation and requires safety precautions.
 2. Problems in the recovery of solvents, which increase the equipment and operation costs.
 3. The volatilization of solvents, limits the thickness of the sheet obtained from the calender, so that compression of a number of sheets is absolutely required, in order to obtain a massive sheet.

In addition to these disadvantages of the method itself, there is also a general drawback that these sheets can be produced only by calendering. As known, calendering equipment is much more expensive than extruder or injection molding machines.

Sheets of thermoplastic materials are now generally produced in an extruder which is much simpler and cheaper than a calender; thus for example, P.V.C. sheets are now produced mainly by extrusion. Therefore, considerable effort was put forth in examining the dry blending of P.V.C. with asbestos and extruding the mixture, but no satisfactory blends were obtained even at relatively low asbestos levels. The reasons for this failure are connected with the following main problems encountered:
 a. The thermal stability of P.V.C. with the addition of asbestos sharply decreases. Even the most effective stabilizers known up to now are not capable of hindering the great reduction in the thermal resistance of the P.V.C. This reduction is further increased by the presence of the impurities of iron normally present in any type of asbestos.
 b. The viscosity of the mixture P.V.C. — asbestos is greatly increased compared to P.V.C. alone; a fact which makes it necessary to increase the input of mechanical power in order to process the mixture. This mechanical energy is released as frictional heat and further increases the degradation of the polymer. Due to the above problems, only the calendering method is now utilized for the manufacturing of asbestos-reinforced P.V.C. rigid products, where lower processing temperatures than those in the extruder are involved.

It is one of the objects of the present invention to describe new compositions of P.V.C. homopolymers, P.V.C. copolymers or their mixtures, with asbestos, which can be processed into rigid products by extrusion or injection molding.

It is another object of the present invention to described new compositions of P.V.C. homopolymers, P.V.C. copolymers or their mixtures, with asbestos which can be processed without substantially decreasing the thermal polymer stability of the P.V.C. polymer.

It is still another object of the present invention to describe new compositions of P.V.C. homopolymers or P.V.C. copolymers, reinforced by relative high amounts of asbestos, which compositions can be processed into rigid products by extrusion or injection. These and other objects which may appear as this specification proceeds are achieved by this invention.

The invention, therefore, consists in asbestos — vinyl chloride polymer compositions suitable for melt processing, into rigid products, comprising (a) a vinyl chloride homopolymer, vinyl chloride copolymer or mixtures thereof (b) up to 150% by weight based on the weight of polymer, of asbestos and (c) a stabilizer system which comprises 1–5% by weight based on the weight of polymer of at least one organo-metal compound where the metal is selected from Ba, Cd, Sn, Pb or Ca, or their combinations, at least 3% by weight based on the weight of polymer, of epoxide and 3–20% by weight based on the weight of polymer of a compound selected from a polyol or a metal derivative thereof or an amine compound of polyacetic acid.

In contrast to the attempts described in the prior art, which concentrates in selecting low-iron containing asbestos, a special structure of the asbestos fibers, in order to obtain a stable mixture of P.V.C. — asbestos, the inventors of the present invention have carried out a systematic investigation to find out a stabilizer system which would enable asbestos-reinforced P.V.C. compositions to be obtained, which are amenable to be melt processed by extrusion or injection molding. It was unexpectedly found that using the stabilizer system described above, the P.V.C.-asbestos compositions, can be processed on regular extruders and injection molding equipment without substantial decrease in the thermal stability.

The individual constituents of the stabilizer system as such are indeed known as stabilizers for various plastics materials; for example, several organo-metal compounds are known to be used as stabilizers for P.V.C., but they are not used for P.V.C.-asbestos, since the impurities present in the asbestos eliminate the stabilizing effect of the organo-metal compounds. On the other hand, it was quite surprising to find that other stabilizers not included in the above three groups are not suitable as components for the stabilizer system of the present invention. Moreover even the Ca-Zn derivative of 1-cyanoguanidine, which is the common stabilizer used in P.V.C.— asbestos compositions processed by calendering, was found completely unsuitable. The results given in Table I, in the experimental part, clearly show the poor thermal stability of P.V.C. asbestos composition containing a stabilizer system which includes 1-cyanoguanidine. As can be seen from this Table, the stability of P.V.C. asbestos compositions containing the stabilizer system according to the present invention exceeds by far that in which the known stabilizer for P.V.C.-asbestos is used. (20 minutes versus 5 minutes).

It has been generally admitted that P.V.C.-asbestos compositions require an unique stabilization system and perhaps in view of this fact the calendering method, where lower temperature and shear rates than those of the melting processing of the extrusion or injection methods are used, is the only method now utilized for these compositions. While the exact nature of the action of the stabilizer system is not yet fully known, it seems that a synergetic action occurs in the system of the above three components and their combined effect results in an extraordinary improvement of the thermal stability of P.V.C.-asbestos mass.

The stabilization of P.V.C. is still a very empirical art; many theories have been advanced to explain the mechanism of degradation and stabilization of P.V.C., but while most of these explain a number of isolated phenomena associated with degradation, they are of little value when trying to design the ideal stabilizer. It should be pointed out that, as known from literature, the stabilizer materials when added to P.V.C. are never capable of preventing breakdown of the polymer. These materials are most commonly employed to arrest the degradation of the polymer, which has been initiated and already progressed to some extent, during processing of the polymer. The proper choice of stabilizer will only moderate the rate and type of breakdown.

The stabilizer system, according to the present invention, comprises three distinct groups:

a. Organo-metal compounds, the metal being selected from Ba, Cd, Zn, Sn, Pb, Ca or their combinations. A number of commercial stabilizers can be used, typical examples being: organo tin compounds such as dibutyl-tin dilaurate, dibutyl tin maleate, di n-octyl tin maleate polymer, dibutyl tin lauryl mercaptide, dibutyl-tin iso-octyl thioglycollate, dibutyl tin mercapto-propionate, di-n-octyl tin S,S' bis (iso octyl mercapto acetate), barium laurates, cadmium laurates.

The amount of these compounds normally present in the stabilizer system is in the range of 1–5% based on the weight of the polymer utilized and preferably between 2–3%. The main function of the stabilizers of this group, is to improve the thermal stability of the P.V.C.-asbestos composition. From the examples given in the Tables in the experimental part, it would appear clearly that its incorporation in the mass is absolutely required.

b. Epoxidized-mono and polyesters and ethers for example: epoxidized soybean oil, linseed oil, iso-octyl butyl or 2-ethyl hexyl 9,10-epoxy stearate(s), epoxidized dioctyl hexahydrophtalate, lauryl glycidyl ether, etc., epoxidized alkanes and chloroalkanes, for example: 1-epoxydecane, epichlorohydrin, etc.

The amount of these compounds present in the stabilizer system is at least 3%. It is believed that the main function of the stabilizers of this group is to act as a synergetic agent to the main stabilizer compound of the system described under (a). Addition of excessive amounts of stabilizers from this group will cause a decrease in the strength properties and softening of the products.

c. Polyols such as sorbitol, ucrose, pentaerythritol, glucose, glycerol, polyvinyl alcohol or the metal derivative thereof; amine compounds of polyacetic acids such as nitrilo triacetic acid, ethylene diamine tetraacetic acid.

The amount of these compounds normally present in the stabilizer system is in the range of 3–20% based on the polymer weight and preferably between 5–10%. It seems that the function of the stabilizers of this group is to chelate the impurities normally present in the asbestos composition.

One of the advantages of the melt processing according to the present invention is that sheets with desired thickness may be directly obtained. This is in contrast to the calendering method for P.V.C. — asbestos compositions, where the thickness of sheet is limited due to the volatilization of solvents, as required by this method, and a further compression molding of the thin sheets is then necessary.

The vinyl chloride polymers employed in the present invention can be either vinyl chloride homopolymers i.e., polyvinyl chloride or copolymers of vinyl chloride with one or more ethylenically unsaturated compounds, copolymerizable therewith or their mixtures. Such polymers are well known and are produced in accordance with conventional polymerization processes well known in the art. Among the ethylenically unsaturated compounds which can be polymerized with vinyl chloride, the following can be mentioned: vinyl acetate, ethylene, propylene, iso-butylene, acrylic esters, etc.

When ethylenically unsaturated compounds other than vinyl chloride are present, they are preferably present in amounts not in excess of about 20% and most preferably not in excess of 10% based on the total weight of polymer. Generally, all types of P.V.C. which result in rigid P.V.C. products may be used; preferably, the P.V.C. used will have a certain molecular weight which can be defined in terms of K value which value as known, is dependent on the molecular weight. It was found that rigid sheets of asbestos reinforced P.V.C. with improved properties are obtained when the P.V.C. used has a K value in the range of 55–70. Of course, a polyvinyl chloride with a higher moleclar weight will also improve the strength property of the asbestos-P.V.C. mass. Copolymers of P.V.C. with propylene and other monomers, which gave polymers with improved heat stability, were found most suitable for the purpose of dry blending with asbestos and extrusion or injection molding according to the present invention.

The asbestos to be used according to the present invention may be any common type. As known the four main varieties of asbestos are: Chrysotile, crocidolite, anthophyllite and amosite. The chrysotile is the most widely distributed and abundant form of asbestos and accounts for over 90% of the total asbestos output. Where a combination of extreme bulking characteristics, plus low water content and high temperature resistance are desirable e.g. thermal insulation, amosite is usually preferred. Amosite has the highest specific gravity and fiber length of all tupes of asbestos. The Chrysotile fibers consist of bundles containing millions of single crystal fibrils, which fibrils are hollow tubes in cross section. From the prior art it is known that the properties of P.V.C. reinforced with asbestos fiber are significantly affected by the length of the fibers in the composition, the properties being better with increased fiber length. However, the price of the fiber is much higher with an increase in the fiber length.

According to the present invention it was found that good heat stability properties are achieved during processing of the new compositions using any fiber of asbestos.

Another parameter which generally influences the compositions with asbestos is the iron content of the asbestos; normally, the iron content is in the range of 1 to 6%. From the prior art it is known that, for the P.V.C. — asbestos compositions to be used in sheets for various purposes, an unique stabilizer is required, to neutralize the color development produced by the iron. Sometimes strict limitations are imposed in the use of asbestos with a relative high concentration of iron, since as known, iron accelerates the degradation of polyvinyl chloride chains.

In addition to the stabilizer system to be used for the melt processing of the P.V.C. — asbestos compositions according to the present invention, conventional lubricants and pigments used in the P.V.C. industry have to be added. Each of these ingredients and any desired further additives may be selected from the wide range of known lubricants such as polyester waxes, glyceryl monostearate and other glycerydes, ethylene bis-stearamide, paraffin, low molecular polyethylene, stearic acid, etc. By reducing frictional heat development during processing, these additives indirectly contribute also to the heat stability. These additives are used in the range of 0.05–2 parts per 100 parts of polymer; excessive amounts of it causing decrease in the strength of the material.

The heat stability of the asbestos reinforced P.V.C. was measured by a Brabender-Plastograph instrument, where the measuring head was Roller mixer No. 50 with a volume of 60 cm$^3$. This instrument enables one to read temperatures and the torque developed in the material during its processing. The Brabender Plastograph subjects the plastic composite to shear forces and records torque as a function of time at constant rotational speed and temperature. Torque in the mixing chamber is measured on the motor shaft of the dynamometer that drives the mixing blades. The plastic melt temperature is measured by a thermocouple situated between the two rotors on the inside of the chamber and is recorded on a strip chart.

In all the experiments performed the operational conditions of the Brabender were kept constant, in order to compare properly the results of stability. The blades inside the measuring head were rotating during the test at a speed of 30 r.p.m. The temperature of the oil in the jacket of the measuring head was kept at 190°C. The volume of the mixture introduced into the tests was always kept constant, being calculated from the density of the polymer melt of the asbestos and other ingredients. Due to the degradation of the polymer chains and formation of free radicals cross linking between the chains occured which caused an increase in the torque which was mentioned on the Brabender graph. The stability time of the mixture was measured from the time that the mixing was started to the time that an increase in the torque appeared on the graph. This period of time is called in the Tables given below as "stability time"; the longer will be this time, the more stable will be the composition mixture.

The preparation of the dry blend compositions on the Brabender as performed as follows:

The P.V.C., or the copolymer of vinyl chloride (V.C.), or other mixtures was mixed with the asbestos and the stabilizer system in the mixing compartment of the Brabender instrument, which was of the sigma bladed mixer type. The sigma blades were rotating at a speed of 80 r.p.m.; the temperature of the oil in the jacket of the mixing compartment was 100°C. The mixing of the dry blend of P.V.C., asbestos and the stabilizer system was done for 30 minutes.

In the following experimental part, the invention will be further illustrated, showing the improvement in the stability time brought by each component of the stabilizer system, demonstrating comparatively the stability time which results when one of the components is not used. The asbestos type 7 and type 4 used in the experiments are defined according to the Committee of Uniform Classification and grading of Asbestos Mines products of the Canadian standard. This standard has been accepted by all asbestos corporations. Type 7 and type 4 are both grouped under milled asbestos, but group 4 has medium length fibers, whereas group 7 has short fibers.

It is understood that the following examples are given merely for a better clarification of the invention and the way the invention is to be carried out without being limited thereto. It should also be noted that Experiments 2, 4 and 5 from Table 1 do not illustrate this invention but show the results of stability time using the common stabilizer known from the prior art for the asbestos — P.V.C. compositions, alone (Exps 1 and 4) or in mixture with other stabilizers (Exps 2 and 5), in comparison with the stabilizer system used according to the present invention (Exps 3 and 6).

All the experiments were carried out under th same conditions in order to compare the stability time of the compositions. Also the same quantities of mixtures were used. Changes were done in the compositions of the stabilizer system, the polymer compositions, and the asbestos used as described in the following experiments.

In the first three experiments of Table 1, the polymer used (100 parts) was P.V.C. homopolymer having a K value = 70. In the other three experiments mentioned in this Table the copolymer consists of 95% V.C. and 5% Propylene (K = 63). The asbestos used in all six experiments was of type 7 and the quantities used were 50 parts by weight based on the polymer.

TABLE 1

| Exp. No. | Stabilizer system used: parts by weight based on the polymer | | | | Stability time Minutes |
|---|---|---|---|---|---|
| | Ca-Zn derivative of 1-cyanoguanidine | Epoxide Soybean oil | Ca-Zn deriv. of Pentaerytritol | Dibutyl tin-laurate | |
| 1 | 5 | — | — | — | 5 |
| 2 | 5 | 5 | — | 2.5 | 8 |
| 3 | — | 5 | 5 | 2.5 | 20 |
| 4 | 5 | — | — | — | 5 |
| 5 | 5 | 5 | — | 2.5 | 8 |
| 6 | — | 5 | 5 | 2.5 | 31.5 |

Experiment 1 shows the poor stability of the P.V.C. — asbestos composition using the known stabilizer from the prior art used for this composition in the calendering method. Experiment 2 shows that no practical improvement in this stability is achieved by adding to this stabilizer the other components found by the present invention to be required in the stabilizer system; in this experiment the stability time was only 8 minutes. On the other hand, in Experiment 3 using the stabilizer system according to the present invention, the stability time was much superior — 20 minutes — compared to the previous ones — 8 and 5 minutes.

The same conclusions are drawn from Experiments 4, 5 and 6 where a copolymer of 95% vinyl chloride (V.C.), and 5% propylene are used; only when the stabilizer system according to the present invention is used, a good stability time is achieved — 31.5 minutes, (versus 5 minutes when the known stabilizer is used.).

In the experiments given in Table 2 the copolymer used (100 parts) consisted of 92.5% V.C. and 7.5% propylene (K = 60). The asbestos was of type 7 and the quantities used were 50 parts by weight on the polymer.

TABLE 2

| Exp. No. | Stabilizer system used: parts by weight on the polymer | | | Stability time minutes |
|---|---|---|---|---|
| | Dibutyl tin mercaptide | Epoxide linseed oil | Sucrose | |
| 7 | 2.5 | 5 | 5 | 62 |
| 8 | 2.5 | — | 5 | 20.5 |
| 9 | — | 5 | 5 | 6.5 |
| 10 | 2.5 | 5 | — | 15 |

The results of these experiments are self-explanatory, showing that the presence of all three components in the stabilizer system is absolutely required in order to obtain a good stability. In Experiments 8, 9 and 10, when one of the components was omitted, a sharp decrease in the stability time occurs.

In the experiments given in Table 3 the copolymer used (100 parts) consisted of 92.5% V.C. and 7.5% propylene (K = 60). The asbestos used was of type 7 and the quantities used were 50 parts by weight on the polymer.

TABLE 3

| Exp. No. | Stabilizer system used; parts by weight on the polymer | | | Stability time minutes |
|---|---|---|---|---|
| | Dibutyl tin mercaptide | Epoxide soybean-oil | Ca-Zn pent-aerythritol | |
| 11 | 2.5 | 10 | 5 | 51 |
| 12 | 2.5 | 10 | — | 28 |
| 13 | — | 10 | 5 | 8.5 |
| 14 | 2.5 | — | 5 | 20.5 |

Here again the improvement in the stability time of the copolymer of V.C. - asbestos, using another composition of the stabilizer system according to the present invention is clearly illustrated — 51 minutes compared with 28, 20.5 and 8.5 minutes in Experiments 12, 13 and 14 in which one of the components was omitted.

In the experiments given in Table 4, the same stabilizer system was used with P.V.C. homopolymer (100 parts) and vinyl chloride propylene copolymer (100 parts). The figures given for asbestos and stabilizer components are in parts by weight based on the polymer.

TABLE 4

| Exp. No. | Polymer used | Asbestos type 7 | Stabilizer system; parts by weight on polymer | | | Stability time minutes |
|---|---|---|---|---|---|---|
| | | | Dibutyl tin ester | Epoxysoybean oil | Ethylene diamine tetraacetic acid | |
| 15 | P.V.C.(K=65) | 50 | 2.5 | 5 | 16 | 19.5 |
| 16 | P.V.C.(K=65) | 50 | 2.5 | — | 16 | 9.5 |
| 17 | P.V.C.(K=65) | 50 | — | 5 | 16 | 5.5 |
| 18 | P.V.C.(K=65) | 50 | 2.5 | 5 | — | 10 |
| 19 | 92.5% V.C. + 7.5% Propylene (K=60) | 10 | 2.5 | 5 | 3.2 | 100 |

TABLE 4-continued

| Exp. No. | Polymer used | Asbestos type 7 | Stabilizer system; parts by weight on polymer | | | Stability time minutes |
|---|---|---|---|---|---|---|
| | | | Dibutyl tin ester | Epoxysoybean oil | Ethylene diamine tetraacetic acid | |
| 20 | " | 10 | — | 10 | 3.2 | 21 |

The results of this table show the influence of amino compound of polyacetic acid on the stability time; without its presence or by omission of any other components described according to the present invention, poor stability time of the compositions are obtained. Experiment 20 shows that a poor stability time resulted even with a very low content of asbestos, when not all the components of the stabilizer system, according to the present invention, are present.

In the experiments given in Table 5 the polymer used consisted of 100 parts P.V.C. (K=65). The asbestos used was of type 7 and the quantities used were 50 parts by weight on the polymer.

TABLE 5

| Exp. No. | Stabilizer system used: parts by weight on the polymer | | | Stability time minutes |
|---|---|---|---|---|
| | Dibutyl tin ester | Epoxy soybean-oil | Nitrilo tri-acetic acid | |
| 21 | 2.5 | 5 | 10 | 21 |
| 22 | — | 5 | 10 | 6.5 |
| 23 | 2.5 | — | 10 | 10 |
| 24 | 2.5 | 5 | — | 8 |

The results in this table show the influence of another amino polyacetic acid on the stabilizer system; without its presence poor stability of the compositions P.V.C. - asbestos results.

In the following experiments given in Table 6, the stabilizer system was kept constant: 2.5 parts dibutyl tin mercaptide, 5 parts epoxide soybean oil and 5 parts organo-metallic compound of pentaerytritol (parts by weight on the polymer). The copolymer used was also identical in all experiments (100 parts) consisting of 92.5% V.C. and 7.5% propylene (K=60). The only change in the experiments was the types of asbestos used.

TABLE 6

| Exp. No. | Type of asbestos used | Parts based on Polymer | Stability time minutes |
|---|---|---|---|
| 25 | Canada group 4 | 50 | 46 |
| 26 | Africa group 4 | 50 | 53 |
| 27 | Canada group 7 | 50 | 38 |
| 28 | Africa group 7 | 50 | 55 |
| 29 | Africa group 6 | 50 | 51 |
| 30 | Crocydolyte | 50 | 48 |

The results in this table show that practically no significant difference exists in the stability time using the various types of asbestos. It is the stabilizer system which controls this stability, and as shown in the previous tables, the presence of representative compounds from all three groups is absolutely required in order to obtain a good thermal stability which will enable the melt processing of the asbestos - P.V.C. compositions.

In the following experiments given in Table 7, the stabilizer system was kept constant: 2.5 parts dibutyl tin mercaptide, 5 parts epoxide soybean oil and 5 parts organo-metallic compound of pentaerytritol (parts by weight on the polymer used). The asbestos used was also identical in all experiments (50 parts of asbestos group No. 4 from Africa). The polymer used consisted of various mixtures of PVC and copolymer of VC-Propylene, except in experiment 34 in which PVC alone was used.

TABLE 7

| Exp. No. | Type of polymer used | Stability time minutes |
|---|---|---|
| 31 | 90% PVC (K=65)+ 10% VC-Propylene (K=60) | 38 |
| 32 | 75% PVC (K=65)+ 25% VC-Propylene (K=60) | 44 |
| 33 | 50% PVC (K=65)+50% VC-Propylene (K=60) | 47 |
| 34 | 100 PVC (K=65) | 22 |

The results in this table show the improvement in the stability time of the mixtures of PVC and VC - propylene copolymers, compared with PVC alone.

These mixtures which are much cheaper than copolymers of VC-propylene, may be successfully used with the stabilizer system according to the present invention in the melt processing of asbestos reinforced polyvinyl chloride. The stability time of these mixtures is similar to that of the copolymer VC-propylene (see experiment 26).

As shown by the foregoing, the inclusion of the combination of an organometal compound, epoxide and a compound which is a polyol, metal derivative of a polyol or amino compound of a polyacetic acid in an asbestos-polyvinyl chloride composition in accordance with the present invention provides compositions with a high degree of stability. The degradation of polyvinyl chloride compositions during melt processing is a problem even when the composition contains asbestos in an amount of 1% by weight or less. Hence the present stabilizing system is advantageously incorporated in polyvinyl chloride compositions containing from less than 1 to 150 % by weight of asbestos. As a practical matter polyvinyl chloride compositions containing about 10 to 100 parts of asbestos per 100 parts of vinyl chloride polymer are preferred.

The organo metal compounds used in the stabilizer system according to the present invention are chosen from an organometal compound in use as a stabilizer for polyvinyl chloride, wherein the metal is Ba, Cd, Zn, Sn, Pb, Ca or a combination thereof. Such organometal compounds are known in the art and include for example in addition to the organometal compounds previously mentioned, barium 2-ethylhexoate, barium nonyl-phenate, cadmium 2-ethylhexoate and dibasic lead stearate.

In accordance with the present invention, the epoxide is present in the stabilizer system in an amount of at least 3% by weight based on the weight of the vinyl chloride polymer. The upper limit of the proportion of epoxide is not critical to the present invention. While an excessive amount of epoxide, (substantially more than that required to obtain asbestos-vinyl chloride polymer composition, which is sufficiently stable to undergo melt processing) may cause some decrease in the strength and softening of the product, so that a product with somewhat decreased rigidity results, such compositions are still suitable for melt processing according to the invention. Preferably, however, the epoxide is used in the present asbestos-vinyl chloride polymer compositions in an amount of about 3 to 30% by weight based on the weight of vinyl chloride polymer.

As mentioned above, the third component of the stabilizer system of the invention is a polyol, a metal derivative thereof or an amino compound of a polyacetic acid. The metal derivatives of the polyols are preferably selected from Ba, Cd, Zn, Sn, Pb, Ca or a combination thereof.

We claim:

1. Asbestos-vinyl chloride polymer composition suitable for processing into rigid products by extrusion and injection molding comprising (a) a vinyl chloride homopolymer, vinyl chloride copolymer or mixtures thereof, (b) up to 150% by weight based on the weight of polymer of asbestos, and (c) a stabilizer system which comprises 1–5% by weight based on the weight of polymer of at least one organometal compound where the metal is selected from Ba, Cd, Zn, Sn, Pb, or Ca or their combinations, at least 3% by weight based on the weight of polymer of epoxide and 3–20% by weight based on the weight of polymer of a compound selected from a polyol or a metal derivative thereof or an amino compound of polyacetic acid.

2. Asbestos-vinyl chloride polymer compositions suitable for melt processing into rigid products according to claim 1, in which the polymer consists of a copolymer of vinyl chloride-propylene.

3. Asbestos-vinyl chloride polymer compositions suitable for melt processing into rigid products according to claim 1, in which the polymer consists of a mixture of copolymer of vinyl chloride-propylene and vinyl chloride homopolymer.

4. Asbestos-vinyl chloride polymer compositions according to claim 1 in wich the asbestos is selected from chrysotile, crocidolite, antophyllite and amosite.

5. Asbestos-vinyl chloride polymer compositions according to claim 1 in which the organo metal compound in the stabilizer system is selected from dibutyl-tin mercaptide, dioctyl-tin mercaptide, dibutyl-tin laurate, dibutyl-tin mercaptopropionate, barium laurate and cadmium laurate.

6. Asbestos-vinyl chloride polymer compositions according to claim 1 in which the epoxide compound in the stabilizer system is selected from epoxidized soybean and epoxidized linseed oil.

7. Asbestos-vinyl chloride polymer compositions according to claim 1 in which said polyol in the stabilizer system is selected from at least one member of the group consisting of sorbitol, pentaerythritol, sucrose and glycerol, the metal of said metal derivative of said polyol is selected from a member of the group consisting of Ba, Cd, Zn, Sn, Pb, Ca and combinations thereof and said amino compound is selected from a member of the group consisting of nitrilo triacetic acid and ethylene diamine tetraacetic acid.

8. Rigid shaped product of asbestos-vinyl chloride polymer obtained by extrusion or injection molding of the composition defined in claim 1.

9. Asbestos-vinyl chloride polymer composition according to claim 1 in which said stabilizer system consists essentially of said organometallic compound, said epoxide and said compound selection from a polyol or a metal derivative thereof or an amino compound of polyacetic acid.

10. Asbestos-vinyl chloride polymer composition according to claim 1 in which said stabilizer system consists essentially of about 2–3% by weight at least one organometallic compound selected from a member of the group consisting of dibutyl-tin mercaptide, dioctyl-tin mercaptide, dibutyl-tin laurate, dibutyl-tin mercaptopropionate, barium laurate and cadmium laurate, at least 3% by weight of an epoxide selected from epoxidized soybean oil and epoxidized linseed oil and about 5–10% by weight of a compound selected from a polyol, a metal derivative thereof and an amino compound of polyacetic acid wherein said polyol is selected from a member of the group consisting of sorbitol, pentaerythritol, sucrose and glycerol, the metal of said metal derivative of said polyol is selected from a member of the group consisting of Ba, Cd, Zn, Sn, Pb, Ca and combinations thereof and said amino compound is selected from a member of the group consisting of nitrilo triacetic acid and ethylene diamine tetraacetic acid, each of said % being based on the weight of said polymer.

11. The method of stabilizing compositions of asbestos and vinyl chloride polymer so that the compositions may be formed into rigid products by extrusion or injection molding which comprises mixing a polymer selected from vinyl chloride homopolymer, vinyl chloride copolymer or mixtures thereof with asbestos in an amount of up to 150% by weight and a stabilizing system consisting essentially of 1–5% by weight of at least one organometallic compound wherein the metal thereof is selected from at least one member of the group consisting of Ba, Cd, Zn, Sn, Pb and Ca, at least 3% by weight of epoxide and 3–20% by weight of a compound selected from a polyol, a metal derivative thereof or an amino compound of polyacetic acid, each of said % by weights being based on the weight of said polymer.

12. Asbestos-vinyl chloride polymer composition suitable for processing into rigid products by extrusion and injection molding consisting essentially of a vinyl chloride homopolymer, vinyl chloride copolymer or mixtures thereof, (b) up to 150% by weight of asbestos based on the weight of polymer, and (c) a stabilizer system which comprises 1–5% by weight based on the weight of polymer of at least one organometal compound where the metal is selected from Ba, Cd, Zn, Sn, Pb, or Ca or their combinations, at least 35 by weight based on the weight of polymer of epoxide and 3–20% by weight based on the weight of polymer of a compound selected from a polyol or a metal derivative thereof or an amino compound of polyacetic acid.

13. Asbestos-vinyl chloride polymer composition according to claim 12, in which the polymer consists of a copolymer of vinyl chloride-propylene.

14. Asbestos-vinyl chloride polymer composition according to claim 12, in which the polymer consists of a mixture of copolymer of vinyl chloride-propylene and vinyl chloride homopolymer.

15. Asbestos-vinyl chloride polymer composition according to claim 12, in which said stabilizer system consists essentially of about 2–3% by weight at least one organometallic compound selected from a member of the group consisting of dibutyl-tin mercaptide, dioctyl-tin mercaptide, dibutyl-tin laurate, dibutyltin mercaptopropionate, barium laurate and cadmium laurate, at least 3% by weight of an epoxide selected from epoxidized soybean oil and epoxidized linseed oil and about 5–10% by weight of a compound selected from a polyol, a metal derivative thereof and an amino compound of polyacetic acid wherein said polyol is selected from a member of the group consisting of sorbitol, pentaerythritol, sucrose and glycerol, the metal of said metal derivative of said polyol is selected from a member of the group consisting of Ba, Cd, Zn, Sn, Pb, Ca and combinations thereof and said amino compound is selected from a member of the group consisting of nitrilo triacetic acid and ethylene diamine tetraacetic acid, each of said % being based on the weight of said polymer.

16. Rigid shaped product of asbestos-vinyl chloride polymer obtained by extrusion or injection molding of the composition defined in claim 12.

* * * * *